US009623837B2

(12) United States Patent
Möker

(10) Patent No.: US 9,623,837 B2
(45) Date of Patent: Apr. 18, 2017

(54) SAFETY BELT DEVICE IN A MOTOR VEHICLE

(71) Applicant: Volkswagen Aktiengesellschaft, Wolfsburg (DE)

(72) Inventor: Carsten Möker, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/442,894

(22) PCT Filed: Nov. 5, 2013

(86) PCT No.: PCT/EP2013/073029
§ 371 (c)(1),
(2) Date: Jul. 21, 2015

(87) PCT Pub. No.: WO2014/075952
PCT Pub. Date: May 22, 2014

(65) Prior Publication Data
US 2015/0314749 A1 Nov. 5, 2015

(30) Foreign Application Priority Data
Nov. 14, 2012 (DE) .................. 10 2012 022 278

(51) Int. Cl.
B60R 22/30 (2006.01)
A44B 11/06 (2006.01)
(Continued)

(52) U.S. Cl.
CPC .............. B60R 22/30 (2013.01); A44B 11/06 (2013.01); A44B 11/2557 (2013.01);
(Continued)

(58) Field of Classification Search
CPC . A44B 11/2561; A44B 11/2557; A44B 11/06; B60R 22/30; B60R 2022/1812; Y10T 24/4016
See application file for complete search history.

(56) References Cited

U.S. PATENT DOCUMENTS 3,413,691 A 12/1968 Elsner
3,888,541 A 6/1975 Stephenson
(Continued)

FOREIGN PATENT DOCUMENTS

CN 201856730 U 6/2011
CN 102695635 A 9/2012
(Continued)

OTHER PUBLICATIONS

International Search Report for PCT International Application No. PCT/EP2013/073029, mailed Feb. 13, 2014.
(Continued)

Primary Examiner — Paul N Dickson
Assistant Examiner — Timothy Wilhelm
(74) Attorney, Agent, or Firm — Pearl Cohen Zedek Latzer Baratz LLP

(57) ABSTRACT

A belt fitting for a safety belt device in a motor vehicle, the fitting having a base portion and an adjoining insertion tongue, in which base portion a belt eye is provided, through which a belt strap is guided and which subdivides the belt strap into a shoulder belt portion and a lap belt portion when the belt is fastened, and additionally having a clamping element that is freely movable between a release position, in which the belt strap is run freely movably through the belt eye, and a clamping position in which the belt strap is clamped tightly with a clamping force between the clamping element and a clamping stop. According to the invention, the clamping element and/or the clamping stop has a clamping
(Continued)

contour, with which the belt strap can be clamped tightly in the clamping position over a belt strap width in a non-linear and/or uneven clamping force distribution.

12 Claims, 8 Drawing Sheets

(51) Int. Cl.
*A44B 11/25* (2006.01)
*B60R 22/18* (2006.01)

(52) U.S. Cl.
CPC ... *A44B 11/2561* (2013.01); *B60R 2022/1812* (2013.01); *Y10T 24/4016* (2015.01)

(56) References Cited

U.S. PATENT DOCUMENTS

| | | | | |
|---|---|---|---|---|
| 4,102,020 | A | 7/1978 | Lindblad | |
| 4,386,452 | A * | 6/1983 | Stephenson | A44B 11/10 24/171 |
| 4,903,378 | A * | 2/1990 | Kasai | A44B 11/10 24/171 |
| 4,979,764 | A * | 12/1990 | Drinane | A44B 11/2557 24/171 |
| 5,100,176 | A * | 3/1992 | Ball | A44B 11/2557 24/171 |
| 5,123,153 | A * | 6/1992 | Krauss | A44B 11/10 24/171 |
| D386,110 | S * | 11/1997 | Hetrick | D11/218 |
| 5,771,544 | A | 6/1998 | Wier et al. | |
| 6,708,380 | B2 * | 3/2004 | Schneider | A44B 11/12 24/629 |
| 7,010,836 | B2 * | 3/2006 | Acton | A44B 11/2557 24/170 |
| 7,185,919 | B2 * | 3/2007 | Mather | B60R 22/30 24/170 |
| 7,353,573 | B2 * | 4/2008 | Anscher | A44B 11/006 24/170 |
| 8,079,616 | B2 * | 12/2011 | Higuchi | B60R 22/4604 24/170 |
| 8,801,038 | B2 * | 8/2014 | Hori | B60R 22/00 24/196 |
| 8,820,788 | B2 * | 9/2014 | Goudeau | A44B 11/2561 280/806 |
| 8,840,145 | B2 * | 9/2014 | Bougher | A44B 11/2561 24/171 |
| 8,935,833 | B2 * | 1/2015 | Kaneko | A44B 11/12 24/170 |
| 2011/0119874 | A1 * | 5/2011 | Dziengowski | A44B 11/2561 24/181 |
| 2012/0054989 | A1 | 3/2012 | Eisinger | |
| 2012/0068520 | A1 * | 3/2012 | McFalls | A44B 11/2553 297/468 |
| 2013/0264859 | A1 | 10/2013 | Fukuzawa | |

FOREIGN PATENT DOCUMENTS

| | | |
|---|---|---|
| DE | 26 28 399 A1 | 6/1977 |
| DE | 27 41 297 A1 | 3/1979 |
| DE | 42 15 384 A1 | 11/1992 |
| DE | 29 606 294 U1 | 8/1996 |
| DE | 10 2004 061 709 A1 | 7/2006 |
| DE | 10 2008 037963 A1 | 2/2010 |
| DE | 20 2010 013 986 U1 | 1/2012 |
| EP | 0 430 522 A1 | 6/1991 |
| EP | 1 447 021 A1 | 8/2004 |
| EP | 1 710 140 A1 | 10/2006 |
| JP | 2009 166586 A | 7/2009 |

OTHER PUBLICATIONS

German Search Report for German Patent Application No. 10 2012 022 278.5, dated Jul. 1, 2013.

Office Action for Korean Patent Application No. 10-2015-7010268, dated Jun. 2, 2016.

Office Action for Chinese Patent Application No. 2013800582379, dated Apr. 5, 2016.

* cited by examiner

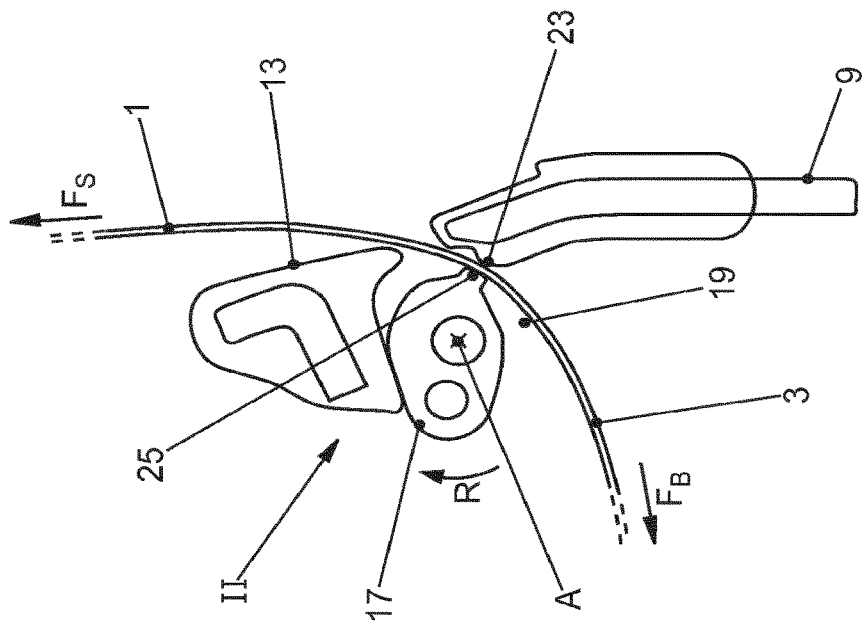
FIG. 4
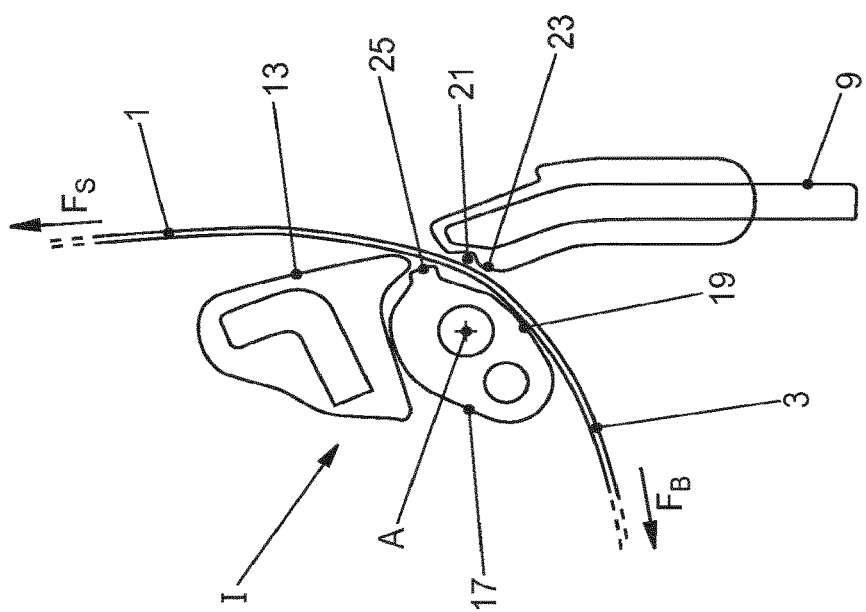
FIG. 3 Section I-I

SAFETY BELT DEVICE IN A MOTOR VEHICLE

CROSS-REFERENCE TO RELATED APPLICATIONS

This application is a National Phase Application of PCT International Application No. PCT/EP2013/073029, International Filing Date Nov. 5, 2013, claiming priority of German Patent Application No. 10 2012 022 278.5, filed Nov. 14, 2012, which is hereby incorporated by reference in its entirety.

FIELD OF THE INVENTION

The invention relates to a belt fitting for a safety belt device in a motor vehicle, and to a safety belt device.

BACKGROUND OF THE INVENTION

The safety belt device in a motor vehicle can be, for example, a lap belt as well as a shoulder belt that runs diagonally across the chest of the vehicle occupant. When the safety belt has been fastened, the lap belt is anchored onto the vehicle frame via two laterally opposing, lower attachment points. Normally, the inner buckling point situated in the crosswise direction of the vehicle is configured to be detachable, namely, with a belt fitting that is provided on the lap belt and whose insertion tongue can be inserted into a belt buckle anchored on the frame side.

German patent application DE 42 15 384 A1 describes a generic belt fitting with a base section and an adjoining insertion tongue. In the base section, there is a belt slit through which a belt strap passes. When the safety belt has been fastened, the belt slit subdivides the belt strap into a lap belt section and a shoulder belt section. In order to block the lap belt section of the safety belt in case of a collision, there is a clamping element that can be adjusted between a release position, in which the belt strap can move freely as it passes through the belt slit, and a clamping position, in which the belt strap is clamped tightly with a clamping force between the clamping element and a clamping stop that functions as a counterbearing. The clamping element can be pivoted around an axis of rotation between the release position and the clamping position, and it is elastically pre-tensioned in the direction of the release position. Consequently, during normal driving, the belt strap can move freely over the running surface of the clamping element. In contrast, in case of a collision, elevated belt forces act upon the clamping element. As a result, the clamping element is moved in a direction of rotation until it reaches the clamping position in which the belt strap is tightly clamped by the clamping force between the clamping element and the clamping stop.

In the state of the art, the clamping element has a clamping crossbar that runs in the crosswise direction of the belt strap. In the clamping position, the clamping crossbar is in linear contact with the belt strap, namely, continuously between the two outer edges of the belt strap in the crosswise direction of the belt strap. This results in a linear, uniform and constant clamping force distribution between the two outer edges of the belt strap over the crosswise direction of the belt strap.

In dynamic safety tests, it was found that, in case of a collision, an excessively high stress can be exerted on the fabric of the belt strap that is clamped tightly between the clamping element and the clamping stop, thus entailing the risk that the belt strap will tear.

SUMMARY OF THE INVENTION

The objective of the invention is to put forward a belt fitting for a safety belt device in a motor vehicle that, in case of a collision, increases the operational safety of the safety belt device.

This objective is achieved according to features of the invention as described herein.

The invention is based on the fact that the belt forces that occur within the scope of dynamic safety tests lead to excessive stress on the clamped fabric of the belt strap. This can be ascribed, among other things, to the linear, uniform clamping force distribution exerted by the clamping crossbar in the crosswise direction of the belt strap. Before this backdrop, the clamping element and/or the clamping stop, which functions as a counterbearing, has a clamping contour with which the belt strap—when it is in the clamped state—is not subjected to a clamping force that is uniform or linear, rectilinear in the crosswise direction, but rather, it is clamped tightly over the width of the belt strap with a non-linear and/or non-uniform clamping force distribution. In this manner, the fabric of the belt strap is partially relieved in the clamping area in the crosswise direction of the belt strap, thereby reducing the risk that the belt strap will tear. In case of a collision, this special clamping contour brings about an irregular as well as non-linear force distribution curve.

An especially preferred embodiment variant is based on the realization that the belt strap often starts to tear at the outer edges of the belt strap. Before this backdrop, it is particularly preferred if the clamping force distribution—relative to the center of the belt strap—is reduced, especially at the outer edges of the belt strap, or if no clamping force is introduced in the area of the outer edges. Accordingly, the clamping contour of the clamping element and/or of the clamping stop in the crosswise direction of the belt strap can be at a distance of one crosswise offset from the outer edges of the belt strap.

In another embodiment, the clamping contour can have at least one clamping projection that extends from the base surface of the clamping element and/or of the clamping stop by a height that is especially smaller than or equal to the thickness of the material of the belt strap. For example, the clamping projection can be a crown or an outward bulge whose apex presses approximately onto the center of the belt strap when it is in the clamping position. In the crosswise direction of the belt strap, the apex can have laterally descending arc sections that make a transition to the above-mentioned base surface of the clamping element or clamping stop.

Especially preferably, in the crosswise direction of the belt strap, the clamping contour can have a number of clamping projections that are at a distance from each other. They can especially make a sinusoidal transition into one another.

In another embodiment, in the crosswise direction of the belt strap, the clamping contour can have consecutive contour sections with a differing geometry and/or position. The contour sections can be at a distance from each other by prescribed lengthwise offsets in the lengthwise direction of the belt strap. The contour sections can also make a sinusoidal transition into one another.

In order to create a belt fitting according to the invention, the clamping element can be pivoted in the base section of the belt fitting around an axis of rotation between the release position and the clamping position by means of a spring element. Moreover, the clamping element can be elastically pre-tensioned in the release position. During normal driving, when the safety belt is being worn, the belt strap can be in sliding contact and can move freely over a running surface of the clamping element. In this case, the clamping element remains elastically pre-tensioned in its release position. In contrast, in case of a collision, far greater belt forces act upon the belt fitting and thus also on the clamping element. When subjected to these elevated belt forces, the clamping element can be moved in a direction of rotation into the clamping position. In this manner, the lap belt section of the safety belt is blocked in a way that is conducive to safety.

The clamping element that can pivot around the axis of rotation can have at least one leading contour section in the above-mentioned direction of rotation that is arranged by one lengthwise offset in front of at least one contour section that is lagging in the direction of rotation. Therefore, in case of a collision, the leading contour section is the first to come into clamping contact with the clamping crossbar, whereas the contour section that is lagging in the direction of rotation only comes into clamping contact with the belt strap after a time delay and at a distance of one lengthwise offset.

In one embodiment variant, the contour section that is leading in the direction of rotation can be arranged in the center in the crosswise direction of the belt strap and it can make a transition to lagging contour sections that are each arranged at the edges. As an alternative to this, the contour section that is lagging in the direction of rotation can be arranged in the center in the crosswise direction of the belt strap and it can make a transition to leading contour sections that are each arranged at the edges.

In a special embodiment, rather than being punctiform and arranged in the center in the crosswise direction y, the above-mentioned apex can extend in the crosswise direction beyond a center area. On the outside, this apex area can make a transition to laterally descending arc sections or outer edges. Accordingly, in the center area of the belt strap, the clamping force curve displays a plateau with an essentially constant clamping force curve. In other words, the clamping crossbar can have a straight or linear configuration in the center area, whereby only its outer edges are rounded off or beveled. Preferably, the length of the center area of the apex that runs straight and/or linearly amounts to less than 85%, especially to less than 75% and/or even more preferably, to more than 50% of the width of the belt strap.

The total length of the clamping crossbar can especially preferably be in the vicinity of about 51 mm. The length of the above-mentioned arc sections can be approximately 10 mm per side.

The advantageous embodiments and/or refinements of the invention explained above and/or presented in the subordinate claims—except, for instance, for the cases of clear-cut dependencies or incompatible alternatives—can be used individually or else in any desired combination with each other.

BRIEF DESCRIPTION OF THE DRAWINGS

The invention and its advantageous embodiments and/or refinements as well as their advantages will be explained in greater detail below, making reference to the drawings.

The following is shown:

FIG. 3 an enlarged sectional view along the sectional plane I-I of FIG. 1, in which the clamping element is shown in the release position;

FIG. 4 the clamping element in the clamping position, in a view corresponding to FIG. 3;

DETAILED DESCRIPTION OF THE INVENTION

Figure 1:
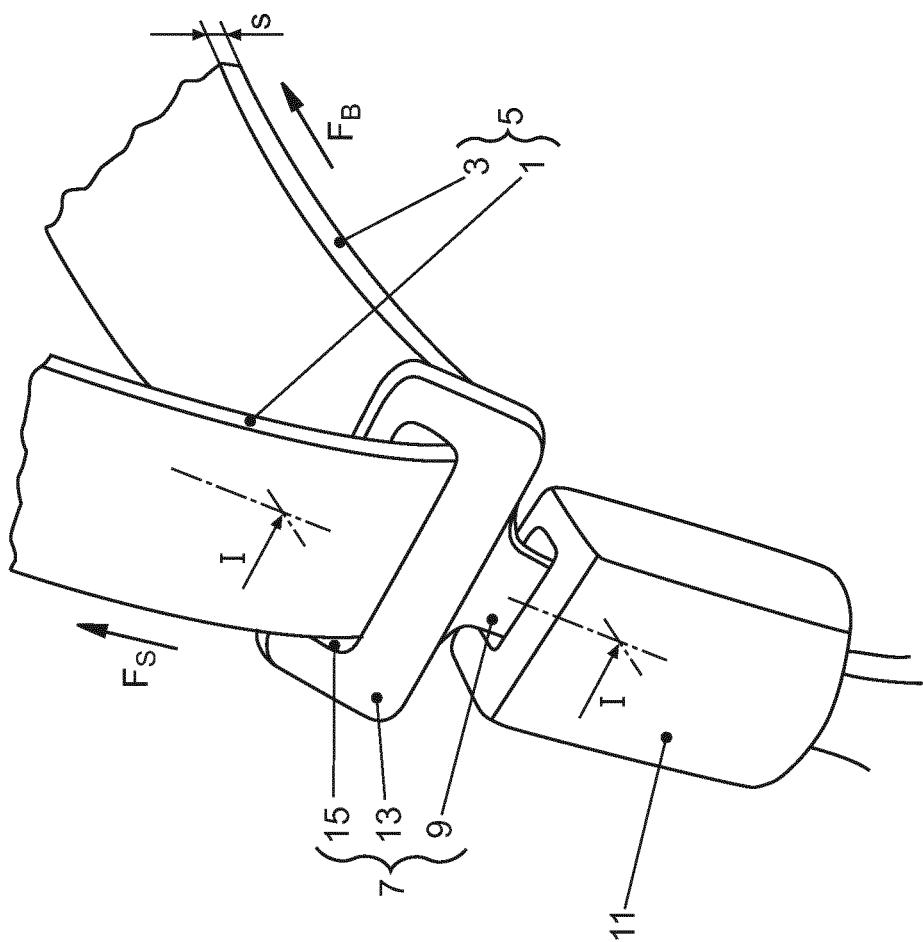
FIG. 1 a section of a three-point safety belt device in a position of use, in which the safety belt is being worn by a vehicle occupant.

The partial view of FIG. 1 shows a three-point safety belt in a position of use, that is to say, in a position in which the safety belt is being worn by a vehicle occupant, said three-point seat belt comprising a shoulder belt section 1 and a lap belt section 3. For the sake of clarity, neither the driver's seat nor the vehicle occupant are shown here. The upper end of the shoulder belt section 1 (likewise not shown here) is connected to a retractor (not shown here) that is arranged, for example, in the B-pillar. According to FIG. 1, the lap belt section 3 extends in the crosswise direction y of the vehicle from an outer attachment point (not shown here) to a belt fitting 7 that is inserted into a belt buckle 11 with an insertion tongue 9.

The belt fitting 7 consists of a base section 13 as well as the above-mentioned insertion tongue 9. The base section 13 of the belt fitting 7 has a belt slit 15 through which the belt strap 5 passes. When the safety belt is fastened, as shown in FIG. 1, the belt strap 5 is subdivided at the belt slit 15 into the shoulder belt section 1 and the lap belt section 3.

Figure 2:
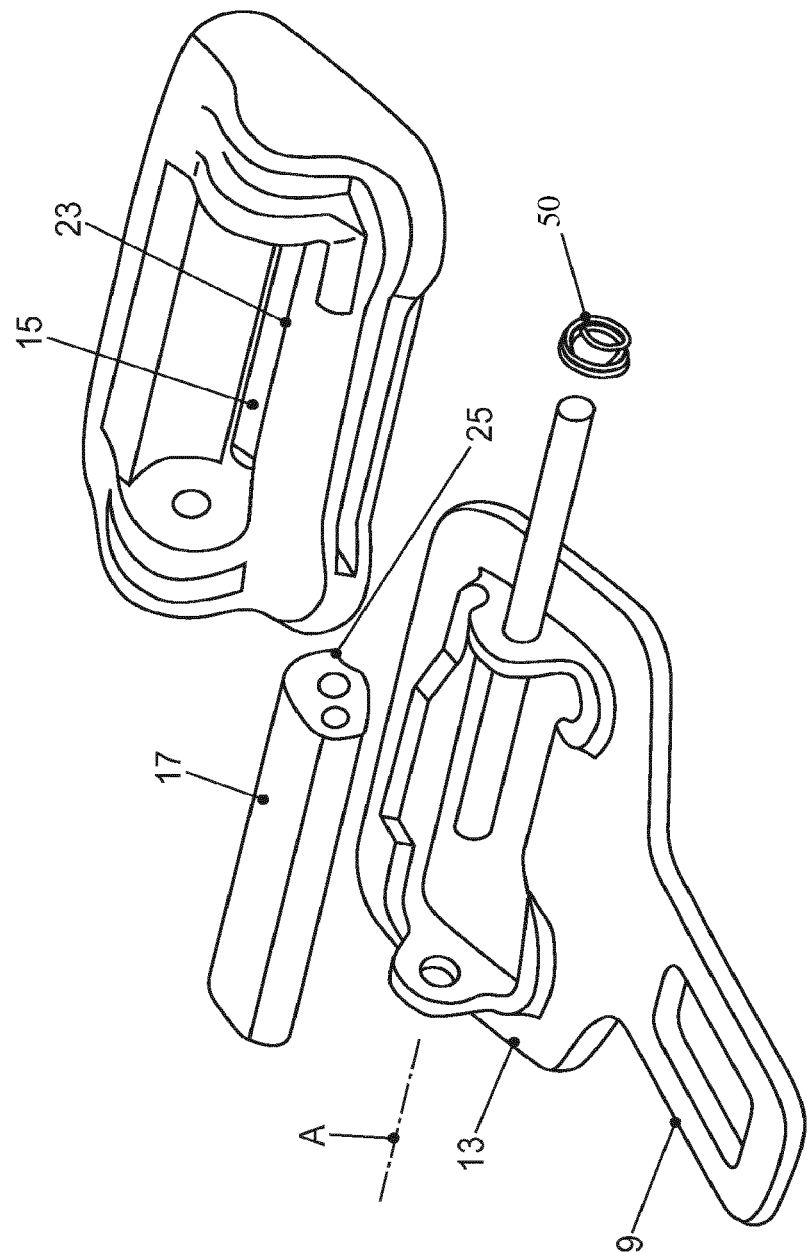
FIG. 2 the belt fitting in an exploded view.

As can be seen in FIGS. 2 and 3, a bar-shaped clamping element 17 is articulated onto the base section 13 of the belt fitting 7 so as to pivot around an axis of rotation A. During normal driving, the clamping element 17 is elastically pre-tensioned by means of a spring 50 (FIG. 2) in a release position I, which is shown in FIG. 3. In the release position I, the belt strap 5 can move freely and it is in sliding contact over a running surface 19 of the clamping element 17.

In the release position I, the clamping element 17, together with a clamping lip 23, forms a clamping gap 21 (FIG. 3).

In FIG. 4, the belt fitting is shown in case of a collision. In case of a collision, very large belt forces $F_B$, $F_S$ act on the lap belt section 3 and on the shoulder belt section 1 of the safety belt. As a result, the clamping element 17 is also subjected to elevated belt forces, as a result of which the clamping element 17 is moved in a direction of rotation R into the clamping position II. In the clamping position II, a clamping crossbar 25 that is shaped onto the clamping element 17 presses the belt strap 5 against the clamping lip 23 with a clamping force $F_K$. Consequently, in case of a collision, the lap belt section 3 is blocked in a manner that is conducive to safety.

Figure 5:
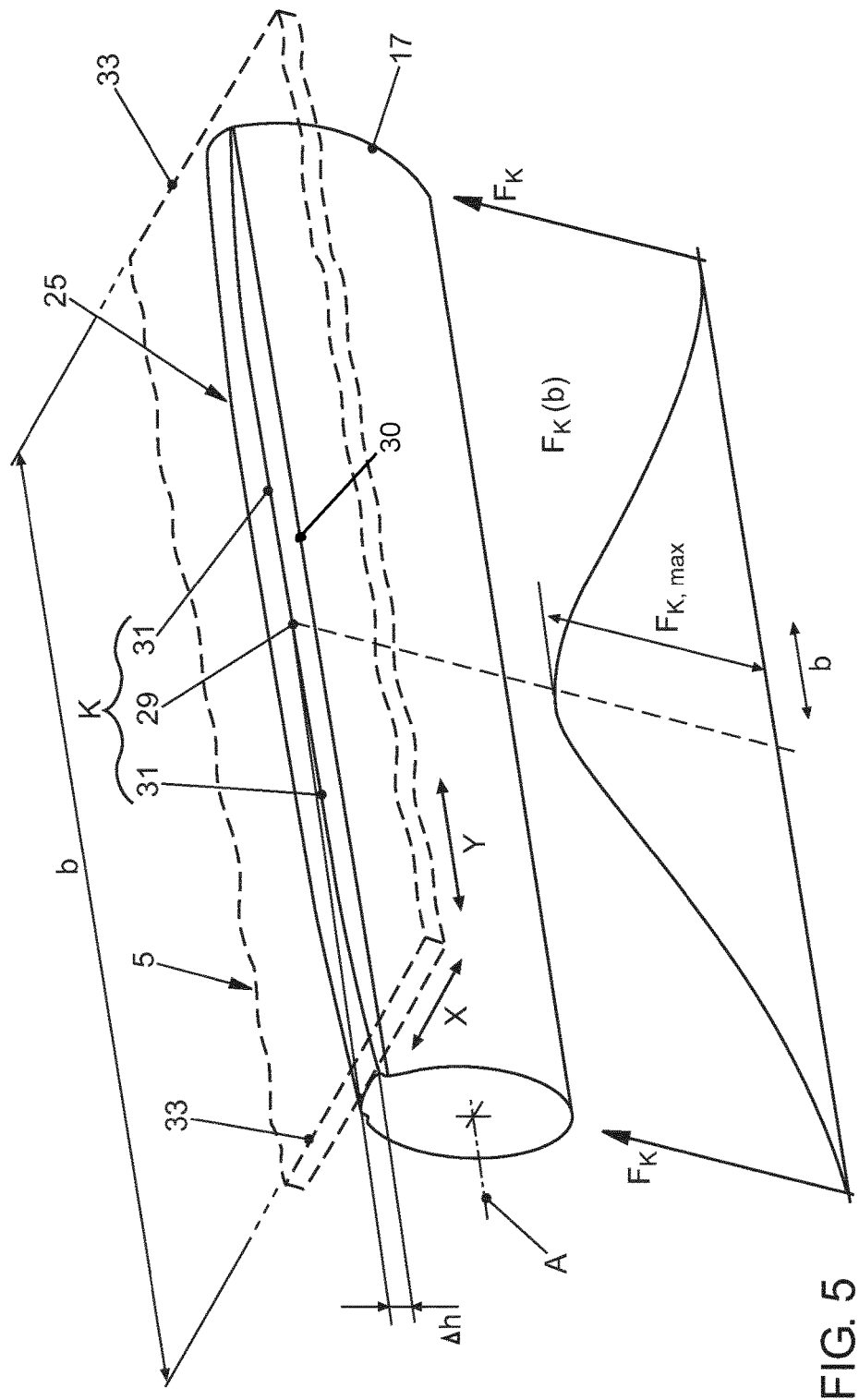
FIG. 5 a clamping element in its clamping position as well as a diagram pertaining to the clamping force distribution in a greatly enlarged and simplified schematic view.

According to FIG. 5, the clamping crossbar 25 of the clamping element 17 is not contoured in the crosswise direction y of the belt strap so as to be rectilinear and planar, but rather, the clamping crossbar 25 has a crown or an outward bulge in the crosswise direction y, namely, with an apex 29 arranged in the center, approximately in the crosswise direction y, as well as arc sections 31 that are laterally descending in the crosswise direction y. The apex 29 as well as the laterally descending arc sections 31 yield a clamping contour K according to FIG. 5, resulting in the depicted distribution F(b) of the clamping force over the width b of the belt strap. The apex 29 of the crown extends by a height Δh from a base surface 30 of the clamping crossbar 25 that is smaller than or equal to the thickness s of the material of the belt strap, which is usually in the vicinity of 1.2 mm.

In the clamping position II shown in FIG. 5, there is no continuous linear or uniform curve of the clamping force distribution between the two outer edges 33 of the belt strap, but rather, there is a non-linear clamping force distribution F(b) with a clamping force $F_{K,max}$ in the center of the belt strap 5. Accordingly, the outer edges 33 of the belt strap 5 are subjected to little or even no clamping force whatsoever.

Figure 6:
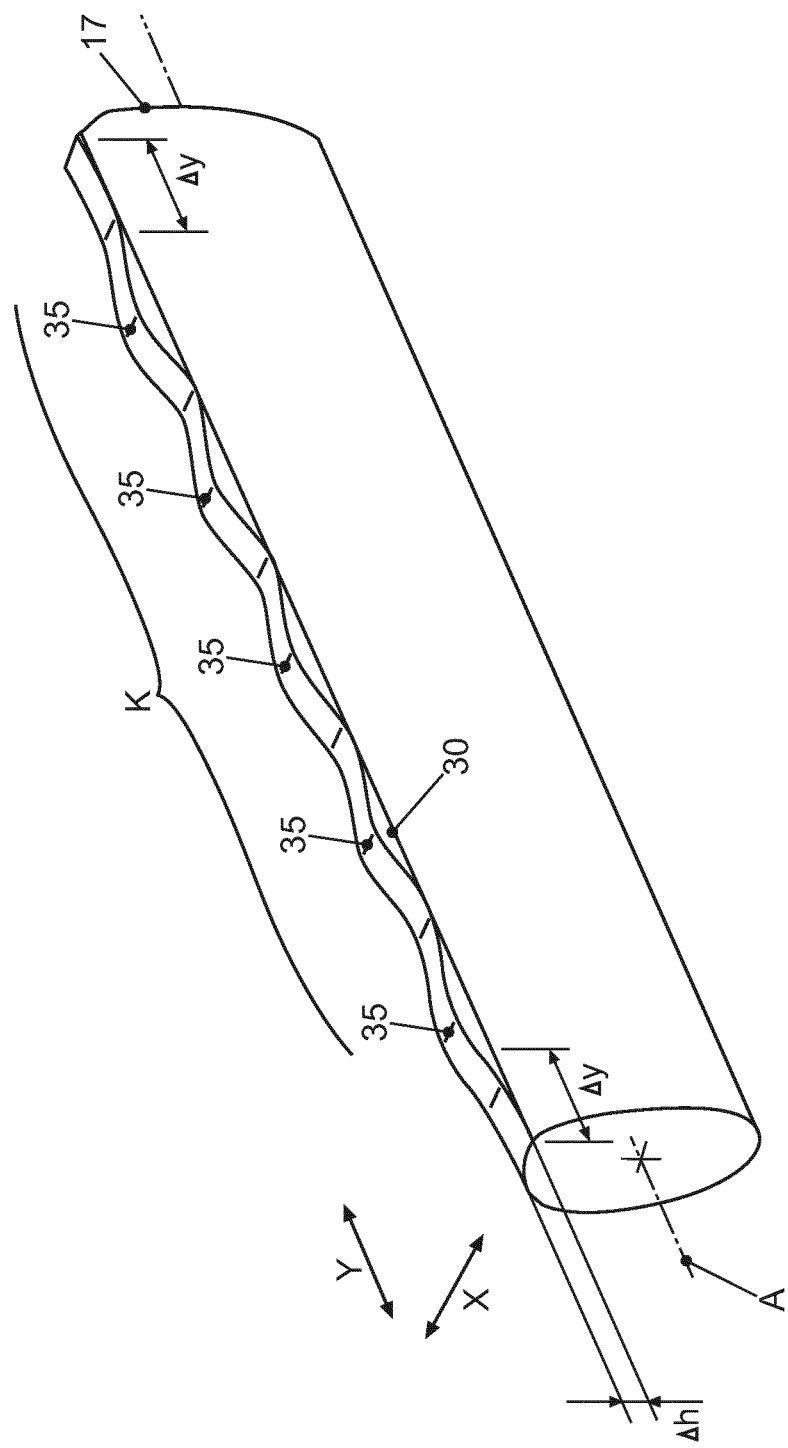
FIGS. 6 to 8 perspective views of clamping elements with different clamping contours.

In FIG. 6, the clamping crossbar 25 of the clamping element 17 has a wavy clamping contour K in the crosswise direction y of the belt strap, comprising a total of five or six clamping projections 35.

The clamping projections 35 make a sinusoidal transition into one another, whereby the indicated amplitude height Δh is likewise smaller than or equal to the thickness s of the material of the belt strap.

Figure 7:
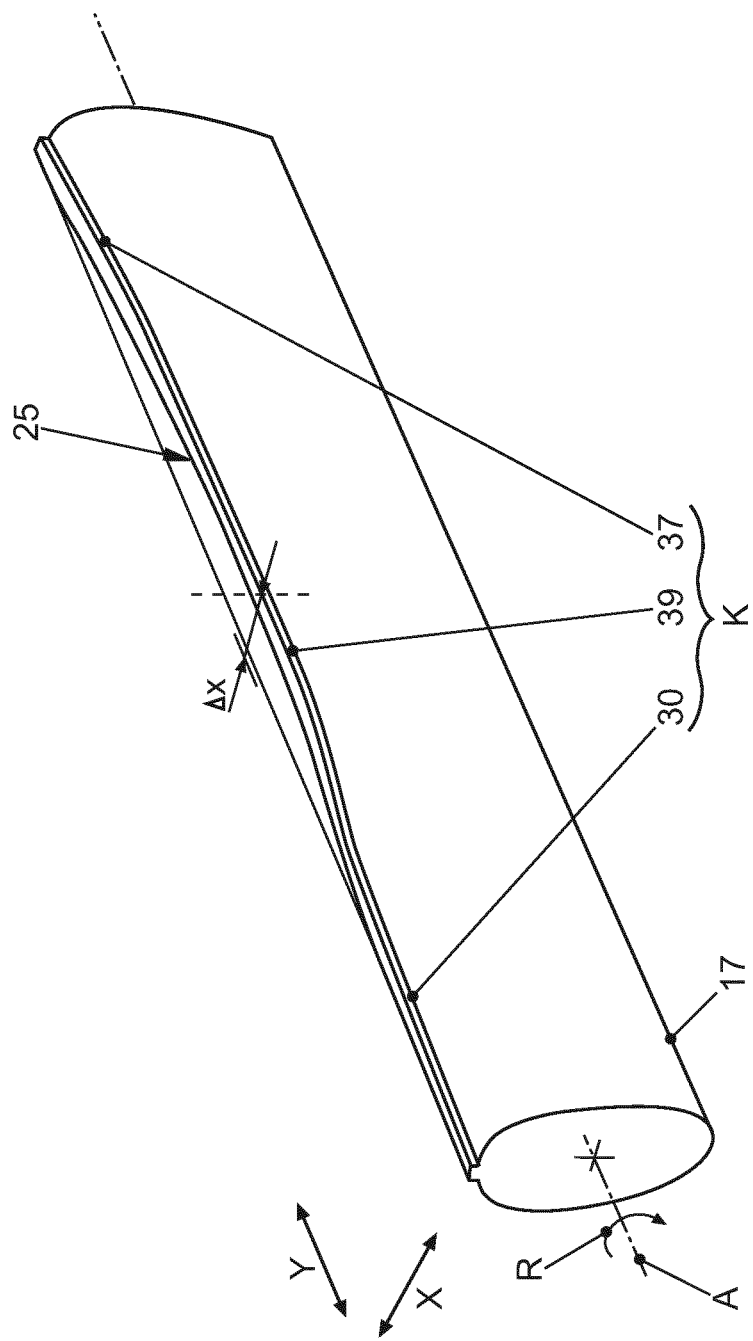

In FIG. 7, the clamping contour K of the clamping crossbar 25 has consecutive contour sections 37, 39 in the crosswise direction y of the belt strap. As seen in the lengthwise direction x of the belt strap, the contour sections 37, 39 are offset relative to each other by a lengthwise offset Δx. Moreover, the contour sections 37, 39 make a sinusoidal transition into one another. In FIG. 7, the center contour section 39 is leading in the actuation direction R relative to the two side contour sections 37. This means that, during the transition to the clamping position II, first of all, the center, leading contour section 39 makes a clamping connection with the belt strap 5. Subsequently, the lagging contour section 37 makes a clamping connection with the belt strap with a time delay and at a distance by a lengthwise offset Δx.

Figure 8:
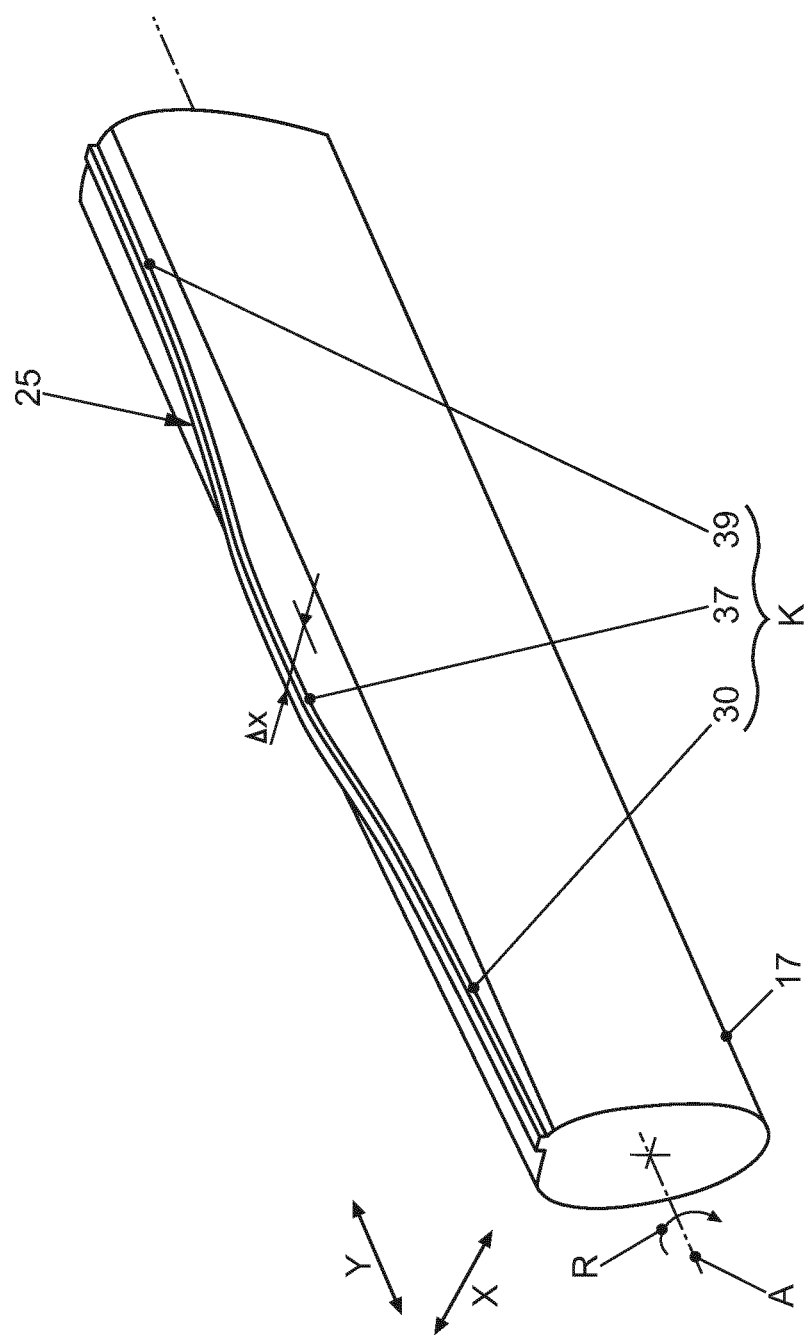

In contrast, in FIG. 8, the contour section that is leading in the direction of rotation R is arranged in the center in the crosswise direction y of the belt strap and it makes a transition to leading contour sections 39 that are each arranged at the edges.

Figure 9:
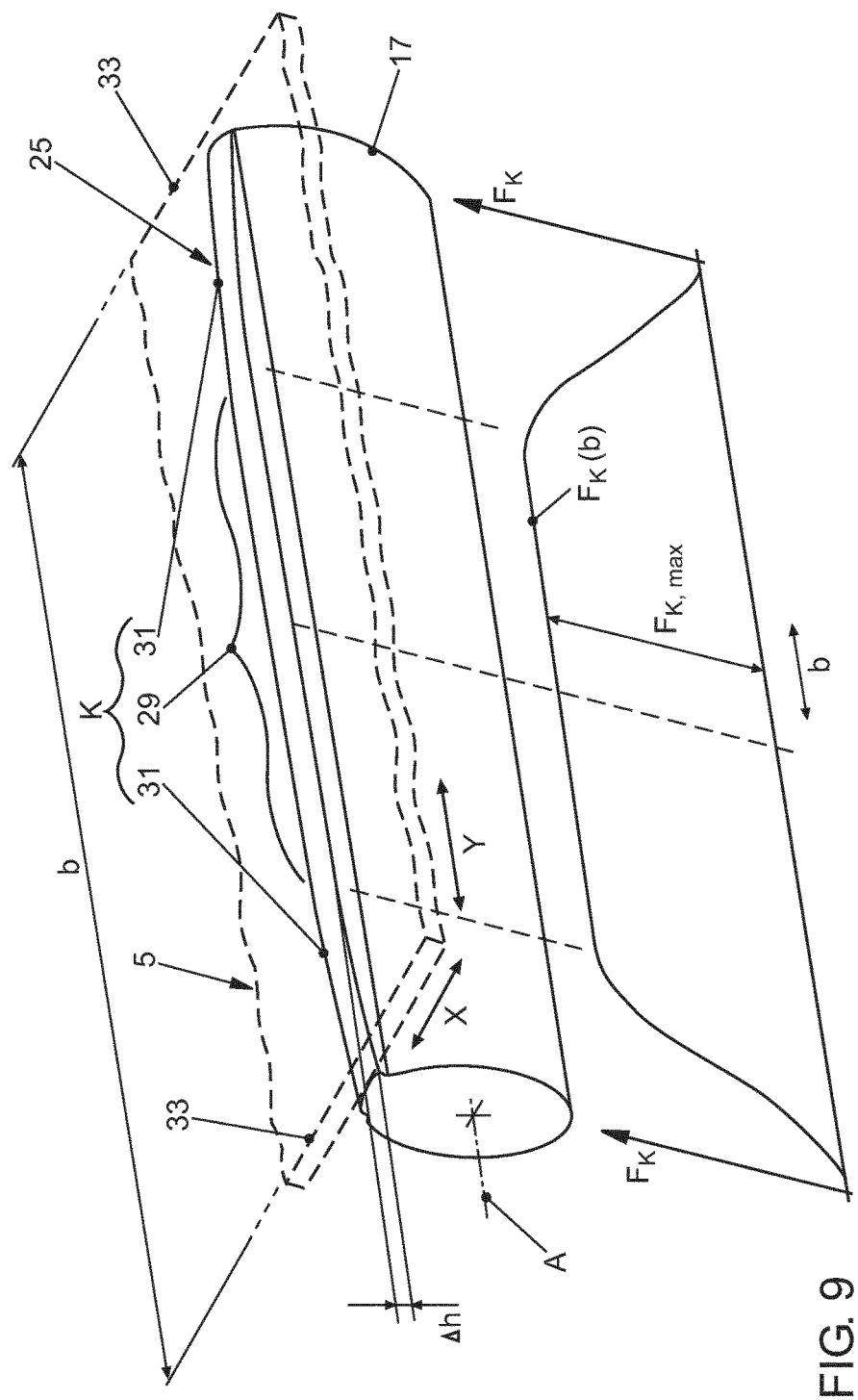
FIG. 9 another embodiment variant of the clamping element in a view corresponding to FIG. 5.

Another embodiment variant of the invention is shown in FIG. 9, in a view corresponding to that of FIG. 5. Unlike in FIG. 5, the apex 29 in FIG. 9 is not punctiform and arranged in the center in the crosswise direction y, but rather the apex 29 extends in the crosswise direction y over a center area that makes a transition on the outside to laterally descending arc sections 31. The outer contour of the apex 29 running rectilinearly over the center area is configured here so as to be parallel to the axis of rotation A of the clamping crossbar 25. Correspondingly, in FIG. 9, the distribution F(b) of the clamping force is not bell-shaped as is the case in FIG. 5, but rather, it has a plateau with an essentially constant clamping force curve in the center area of the belt strap.

Therefore, according to FIG. 9, the clamping crossbar 25 is configured to be straight or linear in the center area, whereby only its outer edges 31 are rounded off or beveled. The length of the rounded-off sections 31 in the crosswise direction y can be about 10 mm on each side. The total length of the clamping crossbar 25 can be approximately 51 mm in each of the embodiment variants shown.

The invention claimed is:

1. A belt fitting for a safety belt device in a motor vehicle, said belt fitting comprising:
    a base section, said base section comprising a belt slit through which a belt strap passes, and which, when the safety belt is fastened, subdivides the belt strap into a shoulder belt section and a lap belt section,
    an adjoining insertion tongue, and
    a clamping element configured to be adjustable between a release position, in which the belt strap can move freely as it passes through the belt slit, and a clamping position, in which the belt strap is clamped tightly between the clamping element and a clamping stop with a clamping force,
    wherein the clamping element and/or the clamping stop has a clamping contour with which the belt strap, when it is in the clamped position, is clamped with a non-linear and/or non-uniform clamping force distribution over a width of the belt strap, wherein the clamping contour comprises a crown or an outward bulge having an apex that presses into a center of the belt strap when it is in the clamping position and with arc sections descending in a crosswise direction of the belt strap.

2. The belt fitting according to claim 1, wherein the clamping contour of the clamping element and/or of the clamping stop is at a distance of one crosswise offset from an outer edge of the belt strap.

3. The belt fitting according to claim 1, wherein the clamping contour has at least one clamping projection that extends from the base surface of the clamping element and/or of the clamping stop by a height that is smaller than or equal to a thickness (s) of a material of the belt strap.

4. The belt fitting according to claim 1, wherein a course of the apex in the crosswise direction is configured to be rectilinear over a center area.

5. The belt fitting according to claim 4, wherein the rectilinear center area of the apex has a length of less than 85% of the width of the belt strap.

6. The belt fitting according to claim 4, wherein the rectilinear center area of the apex has a length of less than 75% of the width of the belt strap.

7. The belt fitting according to claim 4, wherein the rectilinear center area of the apex has a length of less than 50% of the width of the belt strap.

8. The belt fitting according to claim 1,
    wherein the clamping element is configured to pivot around an axis of rotation between the release position and the clamping position, and is elastically pre-tensioned in the release position (I),
    wherein, during normal driving, the belt strap is in sliding contact and can move freely over a running surface of the clamping element, and
    wherein, in case of a collision, when elevated belt forces are exerted, the clamping element can be moved in a direction of rotation into the clamping position.

9. The belt fitting according to claim 1, wherein the clamping force distribution at the belt strap's outer edges is reduced relative to the center area of the belt strap.

10. A safety belt device for a motor vehicle, said safety belt having the belt fitting according to claim 1.

11. The belt fitting according to claim 10, wherein no clamping force is introduced in an area of the outer edges of the belt strap.

12. A belt fitting for a safety belt device in a motor vehicle, said belt fitting comprising:
    a base section, said base section comprising a belt slit through which a belt strap passes, and which, when the safety belt is fastened, subdivides the belt strap into a shoulder belt section and a lap belt section,
    an adjoining insertion tongue, and
    a clamping element configured to be adjustable between a release position, in which the belt strap can move freely as it passes through the belt slit, and a clamping position, in which the belt strap is clamped tightly between the clamping element and a clamping stop with a clamping force, wherein the clamping element and/or the clamping stop has a clamping contour with which the belt strap, when it is in the clamped position, is clamped with a non-linear and/or non-uniform clamping force distribution over a width of the belt strap, wherein in a crosswise direction of the belt strap, the clamping contour has consecutive contour sections that are at a distance from each other by lengthwise offsets in a lengthwise direction of the belt strap, wherein the contour sections that are at a distance from each other by lengthwise offsets make a sinusoidal transition into one another.

* * * * *